(12) United States Patent
Holbrook

(10) Patent No.: US 6,923,138 B2
(45) Date of Patent: Aug. 2, 2005

(54) BOAT TRAILERING SYSTEM WITH SELF-ALIGNMENT AND LATCHING

(76) Inventor: Rockne Byron Holbrook, P.O. Box 158, Fish Haven, ID (US) 83287

(*) Notice: Subject to any disclaimer, the term of this patent is extended or adjusted under 35 U.S.C. 154(b) by 0 days.

(21) Appl. No.: 10/875,455

(22) Filed: Jun. 24, 2004

(65) Prior Publication Data

US 2004/0262881 A1 Dec. 30, 2004

Related U.S. Application Data

(60) Provisional application No. 60/480,798, filed on Jun. 24, 2003.

(51) Int. Cl.[7] .............................................. B63B 21/64
(52) U.S. Cl. ...................... 114/344; 114/44; 280/414.1; 410/77
(58) Field of Search ........................ 114/44, 344, 250; 280/414.1; 410/77

(56) References Cited

U.S. PATENT DOCUMENTS

| | | |
|---|---|---|
| 621,574 A | 3/1899 | Kinsey |
| 843,458 A | 2/1907 | Hoos |
| 988,114 A | 3/1911 | La Belle |
| 2,061,083 A | 11/1936 | Niemi |
| 2,118,729 A | 5/1938 | Hogan |
| 2,478,736 A | 8/1949 | Balzer |
| 2,491,373 A | 12/1949 | Goff |
| 2,506,943 A | 5/1950 | Shreve |
| 2,763,384 A | 9/1956 | Foster |
| 2,844,390 A | 7/1958 | Smith |
| 3,013,517 A | 12/1961 | Isham |
| 3,060,885 A | 10/1962 | Nolf |
| 3,155,249 A | 11/1964 | Johnson |
| 3,161,422 A | 12/1964 | Wade |
| 3,325,186 A | 6/1967 | Lund |
| 3,750,805 A | 8/1973 | Finney |
| 3,912,302 A | 10/1975 | Patterson |
| 3,938,829 A | 2/1976 | Anderson |
| 3,963,263 A | 6/1976 | Whitlock |
| 3,989,267 A | 11/1976 | Robinson |
| 4,463,965 A | 8/1984 | Lawson |
| 4,511,159 A | 4/1985 | Younger |
| 4,641,851 A | 2/1987 | Knies |
| 4,679,812 A | 7/1987 | Byrnes |
| 4,807,899 A | 2/1989 | Belcher |
| 4,826,197 A | 5/1989 | Heinzen |
| 4,836,569 A | 6/1989 | Godbersen |
| 4,919,446 A | 4/1990 | Higgins |
| 5,000,471 A | 3/1991 | Sumrall |
| 5,013,206 A | 5/1991 | Ernst et al. |
| 5,048,854 A | 9/1991 | Clark |
| 5,076,603 A | 12/1991 | Godbersen |
| 5,120,079 A | 6/1992 | Boggs |
| 5,172,928 A | 12/1992 | Capps |
| 5,228,713 A | 7/1993 | Kovach |
| 5,263,733 A | 11/1993 | Kastenberger et al. |
| 5,357,896 A | 10/1994 | Roerig |
| 5,360,226 A | 11/1994 | Gussler, Jr. et al. |
| 5,599,035 A | 2/1997 | Spence |
| 5,666,901 A | 9/1997 | Jones |
| 5,683,214 A | 11/1997 | Jeffreys |
| 5,735,561 A | 4/1998 | Parkins |
| 5,876,166 A | 3/1999 | Hyslop |
| 5,879,114 A * | 3/1999 | Spence ........................ 410/77 |
| 5,882,170 A | 3/1999 | Walton |

(Continued)

Primary Examiner—Jesus D. Sotelo
(74) Attorney, Agent, or Firm—Everett D. Robinson; Parsons Behle & Latimer

(57) ABSTRACT

Disclosed herein are various exemplary watercraft docking systems including a boat attachable portion that couples and aligns to a trailer portion. Detailed information on various example embodiments of the inventions are provided in the Detailed Description below, and the inventions are defined by the appended claims.

17 Claims, 8 Drawing Sheets

U.S. PATENT DOCUMENTS

| | | | |
|---|---|---|---|
| 5,895,185 A * | 4/1999 | Spence | 410/77 |
| 6,086,083 A | 7/2000 | Wilks | |
| 6,102,422 A | 8/2000 | Damron | |
| 6,135,481 A | 10/2000 | Bishop, III et al. | |
| 6,193,432 B1 | 2/2001 | Kampfert | |
| 6,318,747 B1 | 11/2001 | Ratican | |
| 6,382,898 B2 | 5/2002 | Mason | |
| 6,402,445 B1 | 6/2002 | Smiley | |
| 6,422,167 B1 | 7/2002 | Bridges | |
| 6,494,477 B1 | 12/2002 | Parker | |
| 6,540,245 B1 | 4/2003 | Shankle et al. | |
| 6,584,922 B1 | 7/2003 | Fritz et al. | |
| 6,598,896 B1 | 7/2003 | Hyslop | |
| 6,616,166 B2 | 9/2003 | Marchese | |
| 6,648,578 B1 | 11/2003 | Rouse | |
| 6,685,209 B1 | 2/2004 | Guio | |
| 6,726,073 B2 | 4/2004 | Sutton | |
| 2004/0026557 A1 | 2/2004 | Lilly | |
| 2004/0089213 A1 | 5/2004 | Godbersen | |

* cited by examiner

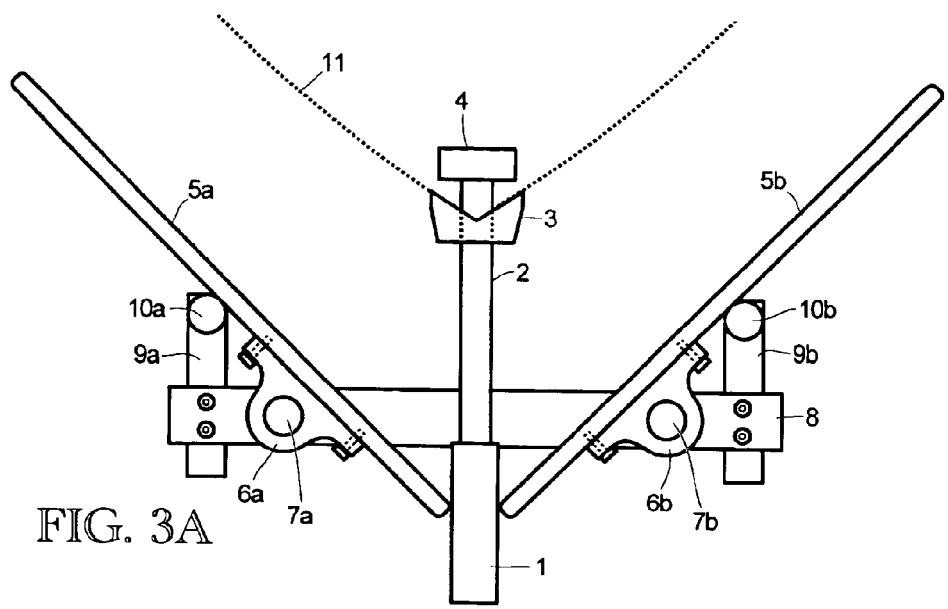
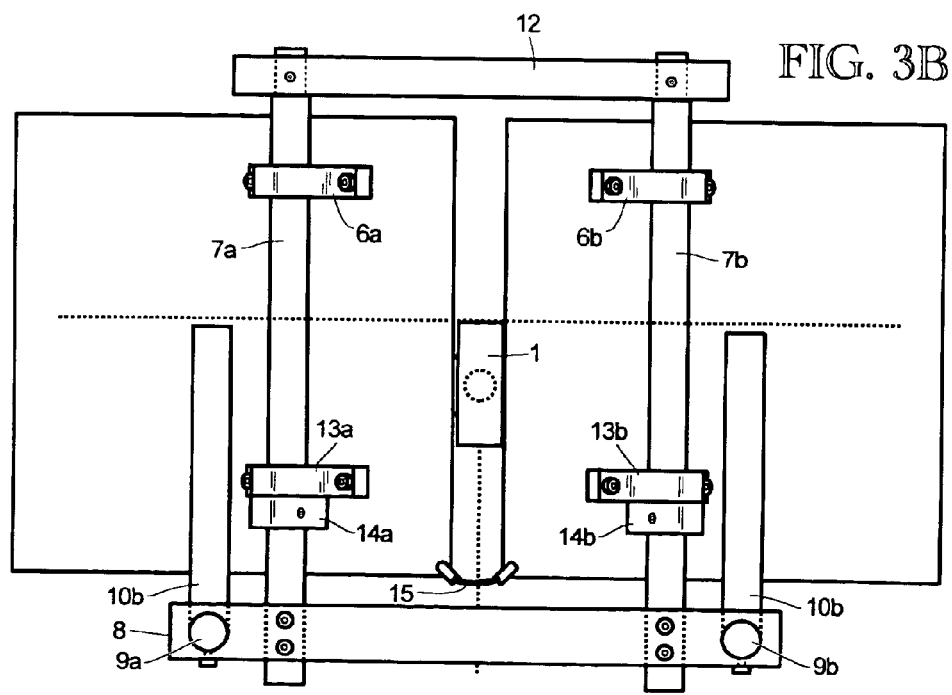

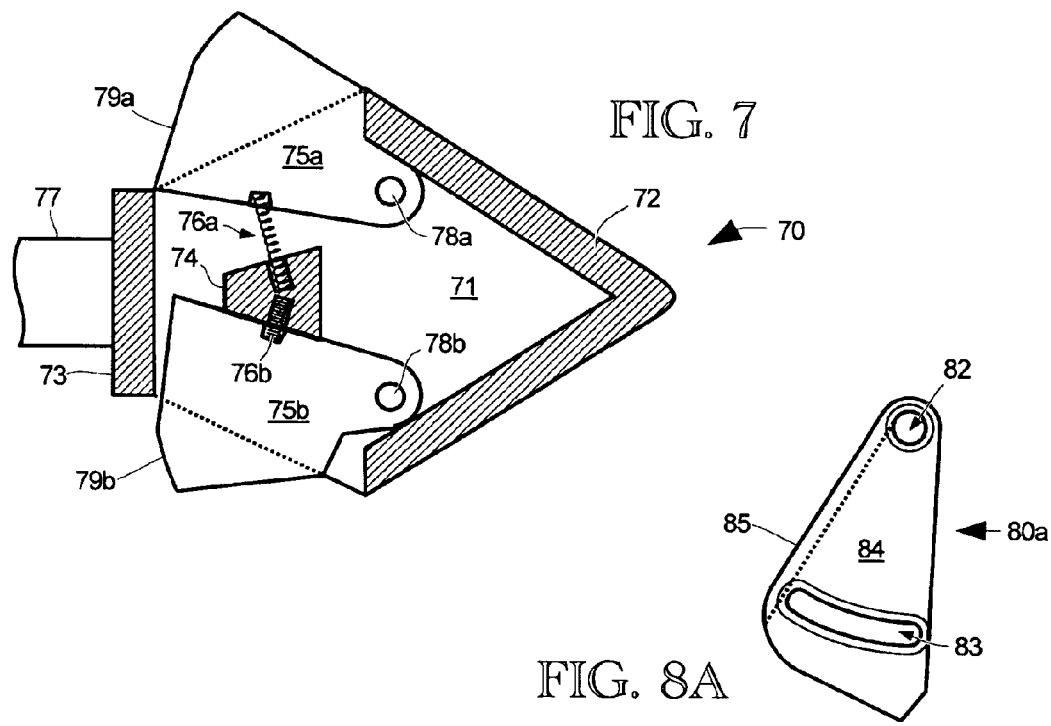
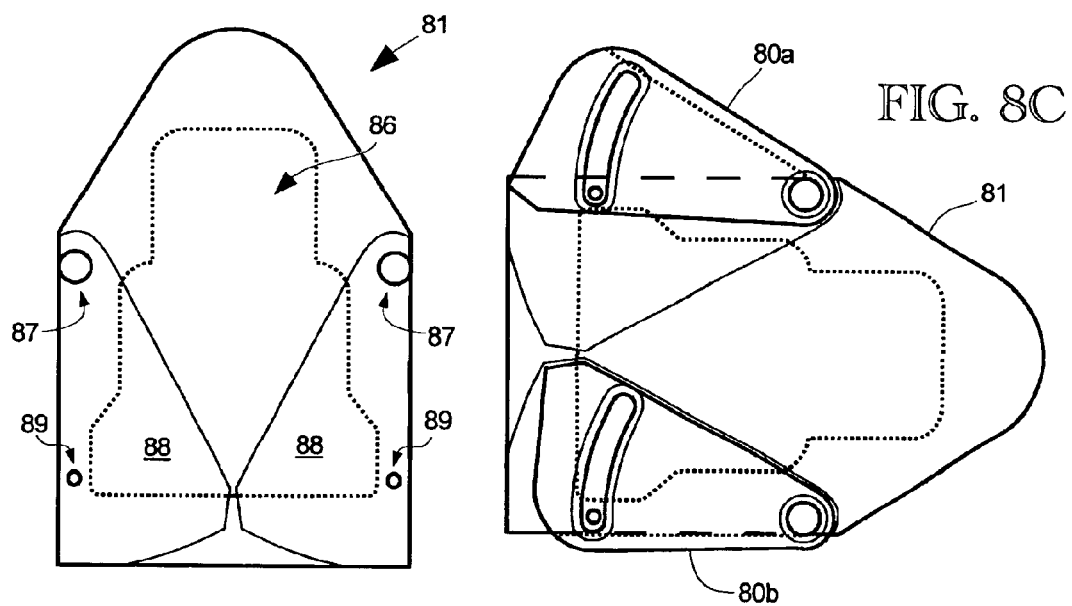

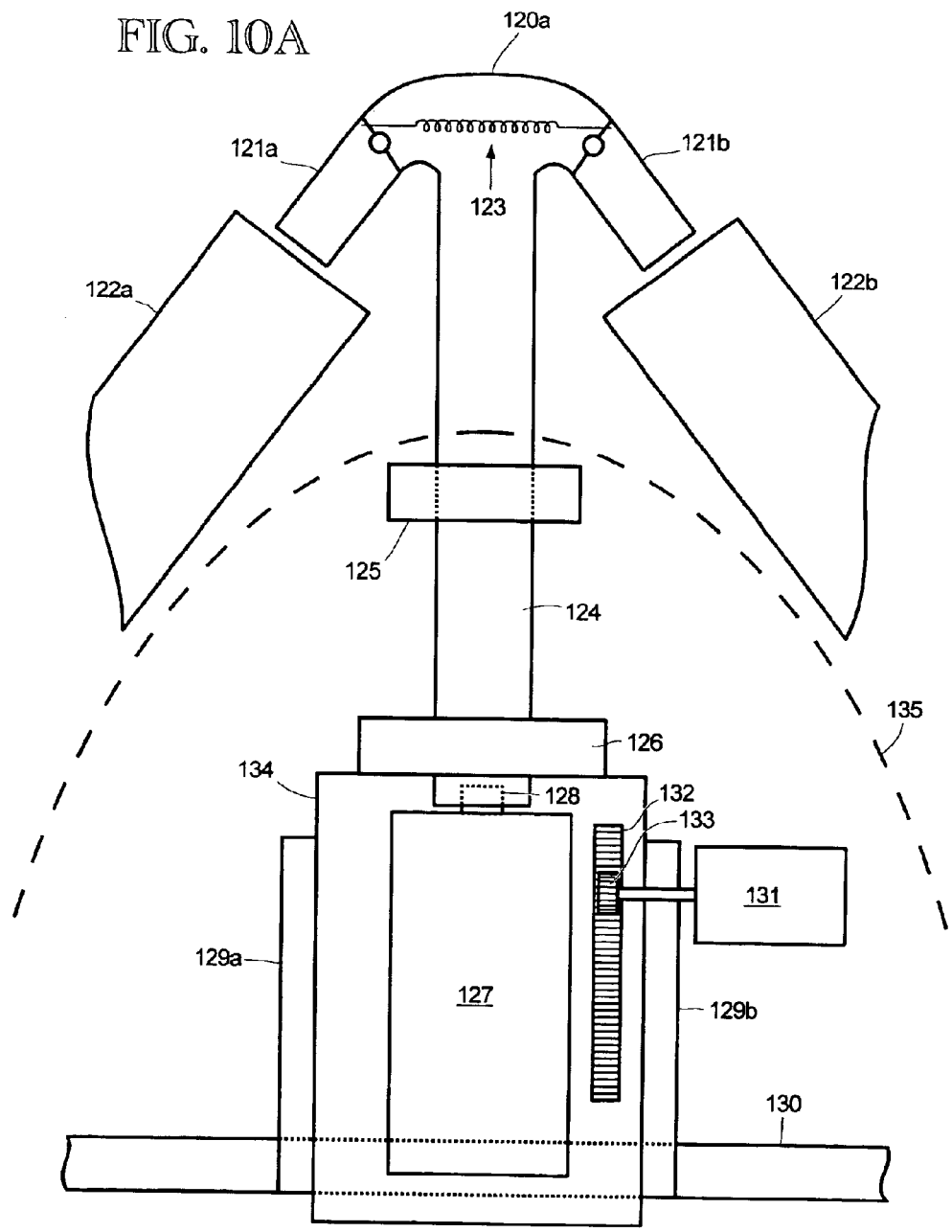

BOAT TRAILERING SYSTEM WITH SELF-ALIGNMENT AND LATCHING

CROSS REFERENCE TO RELATED APPLICATIONS

This Application claims the benefit of the U.S. Provisional Application No. 60/480,798 filed Jun. 24, 2003, which is hereby incorporated by reference in its entirety.

BACKGROUND

The claimed inventions relate generally to boat to trailer couplings, and more particularly to watercraft docking systems that include automatic bow alignment and capturing operation.

BRIEF SUMMARY

Disclosed herein are various exemplary watercraft docking systems including a boat attachable portion that couples and aligns to a trailer portion. Detailed information on various example embodiments of the inventions are provided in the Detailed Description below, and the inventions are defined by the appended claims.

BRIEF DESCRIPTION OF THE DRAWINGS

FIGS. 3A and 3B shows the boat docking system of FIG. 1 in a release state.

FIG. 7 depicts a capturable head having a collapsible profile.

FIGS. 8A, 8B and 8C depict a capturable head having external pawls and an internal motor cavity.

FIG. 10A conceptually illustrates a bow mountable portion having a retractable head mechanism.

Reference will now be made in detail to various systems incorporating a bow mountable portion capturable in a receiver or trailer portion which may include some more specific embodiments of the claimed inventions, examples of which are illustrated in the accompanying drawings.

DETAILED DESCRIPTION

Many persons have come to enjoy the activity of boating on many of the world's lakes and waterways. To transport watercraft from one's home to a water site, a trailer is used, which is generally towed behind a vehicle using roadways. To launch the watercraft a ramp is typically used. The trailer is backed onto the ramp sufficiently to cause the watercraft to begin to float At that point, a pilot enters the watercraft cockpit, while an assistant locates near the winch or other release mechanism. When the watercraft is released from the trailer, the pilot drives the motor in reverse to separate the craft from the trailer, after which the trailer and towing vehicle may be parked. The assistant might then enter the craft from a dock or by wading or swimming to the craft.

To retrieve the craft the process is substantially reversed. The trailer is backed into the water to a certain position. The pilot then carefully guides the craft over the trailer, following which the assistant latches and winches the craft onto the trailer. This procedure can be especially difficult in rough or choppy waters, as the craft may be jostled about in relation to the trailer. Of additional note, in both of the above procedures, the securing and releasing of the craft may be a two-person operation, however one person might perform the procedure if he doesn't mind wading or swimming between the trailer and the released craft.

Figure 1A:
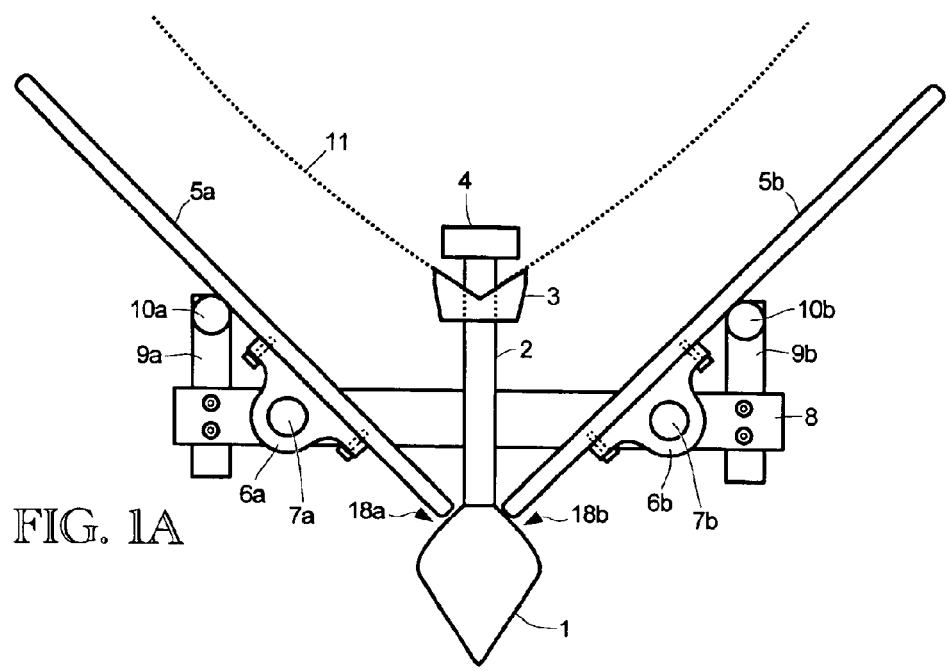
FIGS. 1A and 1B show an exemplary boat docking system with self-alignment and latching in a capture state.
Figure 1B:
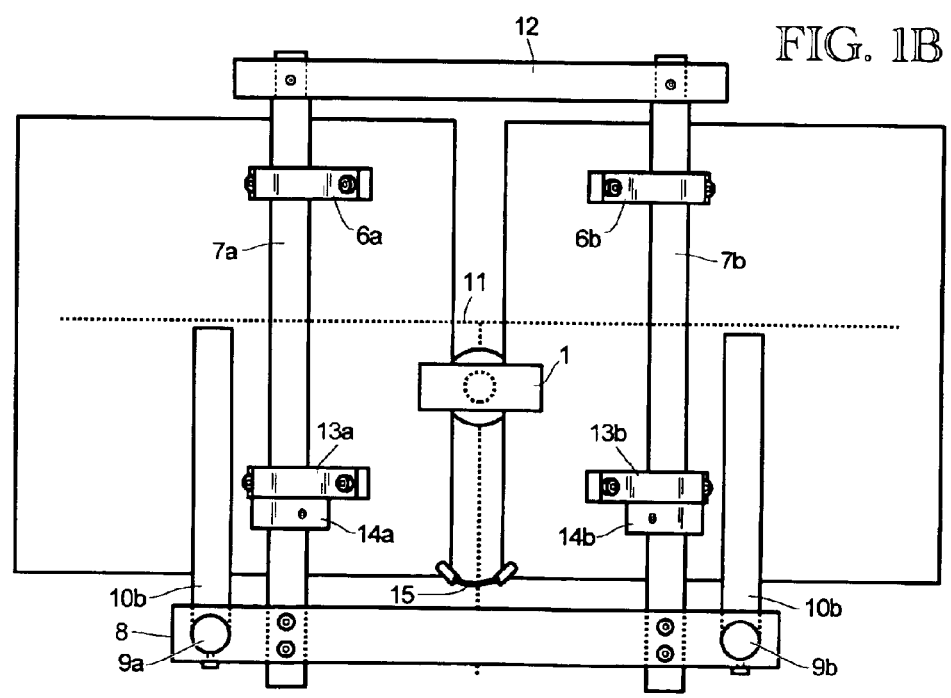

Referring now to FIGS. 1A and 1B, an exemplary boat docking system with self-alignment and latching is depicted in a captured position. That system is divided into a boat attachable portion and a trailer attachable portion. The boat attachable portion includes a protruding head 1 which protrudes from the hull 11 of the boat's bow. Head 1 may be machined from a unitary block of metal, or may be assembled as several rigid or semi-rigid parts. Head 1 might be machined from a metal, such as aluminum, from a plastic, such as Delrin® or nylon, or other composite materials. In this example, head 1 takes on an arrowhead shape, the head coming to a rounded point and having corners extending to provide latching surfaces 18a and 18b. Also in this example, a shaft 2 passes through a guide 3, which maintains the shaft in a forward orientation, the forward direction being relative to the boat. A shaft end 4 provides a lateral securement, which might be through a collar or stop arrangement within hull 11, which is not shown. Further in this example, the head 1 is attached to shaft 2, which shaft is in rotatable communication with a swivel or bearing device located in guide 3. Guide 3 may incorporate a unique mounting bracket specifically and uniquely designed for the particular contour of a receiving craft's bow.

The trailer portion includes two guides, 5a and 5b, which in this example provide several functions. First, the interface between guides 5a and 5b form a separation to enclose the protrusion of the boat portion, in this example shaft 2. Second, guides 5a and 5b provide guidance for a forward moving head, whereby the head 1 may be directed to the separation between the guides. In this example, guides 5a and 5b are shaped as striking plates, although other shapes may be similarly utilized. Third and lastly, the guides 5a and 5b prevent head 1 from moving backward out of the capture position by physical holding force on latchable surfaces 18a and 18b. Further in this example, the ends of guides 5a and 5b may be profiled to provide contact over a wider area of surfaces 18a and 18b, which may be done to inhibit wear and generally provide strength. Also in this example, guides 5a and 5b are rotatably mounted to axial members 7a and 7b, which in this case are rigid cylinders, coupled by rotating sleeves 6a and 6b.

Referring now to FIG. 1B, the separation between guides 5a and 5b is generally vertical, permitting head 1 to move up and down while remaining captured between the guides. In this way, a boat is permitted some freedom to move, which may reduce stress of the various components and assist in properly seating of the boat to the trailer when the trailer is pulled from the water.

Guides 5a and 5b might be fashioned from plate metal, for example stainless steel. Alternatively, guides 5a and 5b may be lined with a substantially frictionless material, for example Dehrin®, which may improve resistance to marring and denting and assisting the aligning movement of the head 1 into the separation between guides 5a and 5b. That lining may also inhibit impact damage to the hull 11 of the watercraft, should the hull impact guides 5a and 5b.

Axial members 7a and 7b are mounted to a base 8, which maintains the position of axial member 7a and 7b relative to each other. A top brace 12 is provided, in this example, to stiffen the system and reduce stress at the lower portions of axial members 7a and 7b. Brace 12 may be set at a height to restrict vertical travel of the head 1, shaft 2 or the boat's bow from vertically exiting the receiver, and may further be lined with a relatively soft material to prevent marring, for example nylon. The vertical position of guides 5a and 5b are held in place by securable stops 14a and 14b. In this example, gravity is utilized to keep the guides 5a and 5b from moving upward, although additional stops may be installed if desired. Also in this example, the vertical position of guides 5a and 5b may be adjusted by moving stops 14a and 14b up or down, as desired. A tensioning component 15 is included to provide a convergent force between guides 5a and 5b, by which the guides are brought together in a restricted separation. Guide stops 10a and 10b, attached by rods 9a and 9b, are provided to maintain a selected separation between guides 5a and 5b. Rods 9a and 9b may provide adjustment of guide stops 10a and 10b, by which guides 5a and 5b may be brought to contact with hull 11, providing further securing and/or clamping of the boat to the receiver in the capture position. In this way these components of the trailer portion act as a receiver for the head 1 and boat generally.

Guide 3 is configured to permit shaft 2 and head 1 to rotate into a capture position and a release position. FIGS. 1A and 1B show the head in a horizontal capture position, while FIGS. 3A and 3B show the head in a release, or vertical position. Referring now to FIGS. 3A and 3B, head 1 has a profile larger than the separation between guides 5a and 5b in one direction, and smaller in another direction. With head 1 in release position, i.e. in a position whereby the smaller profile is presented in the separation between the plates, the latching action is absent, as the latching surfaces 18a and 18b no longer make contact. With nothing to resist backward motion, the boat may gently exit the receiver and depart from the attached trailer.

Figure 2A:
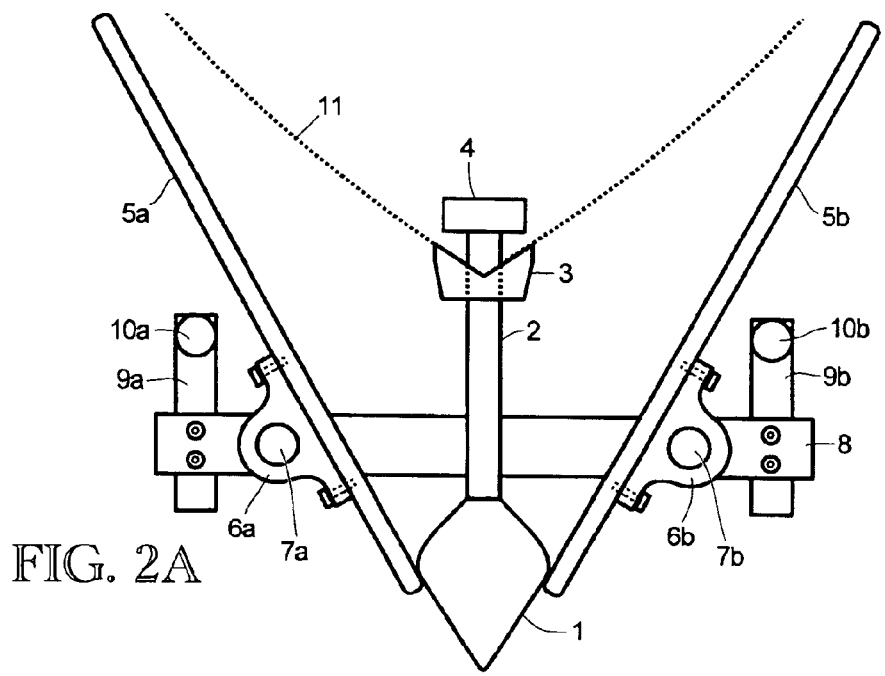
FIGS. 2A and 2B shows the boat docking system of FIG. 1 in an entry state.
Figure 2B:
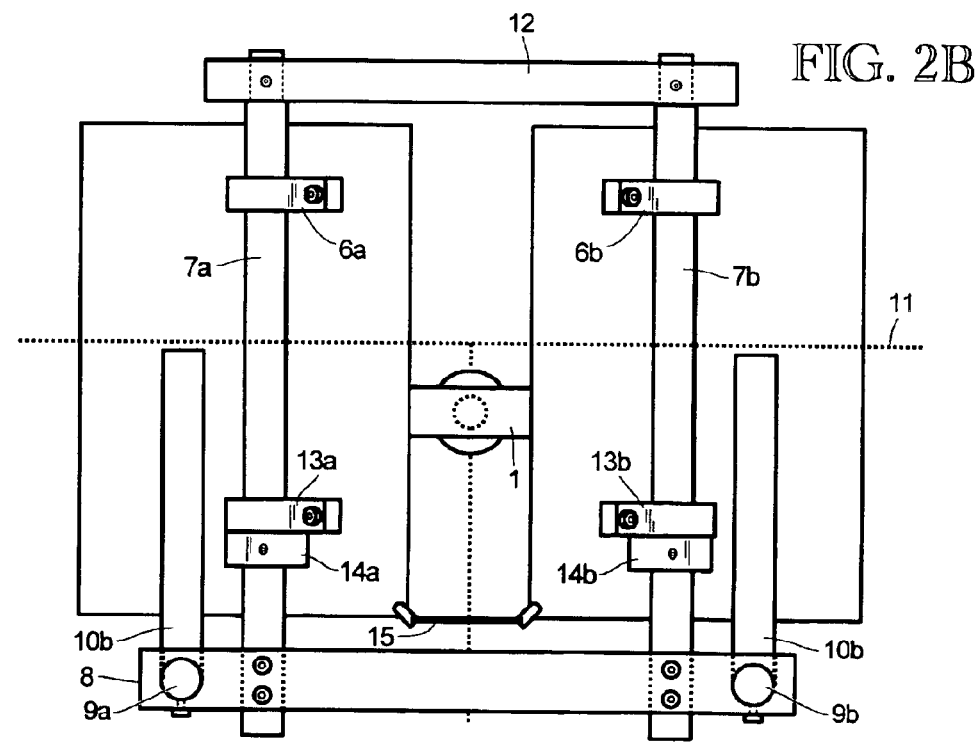

The receiver may also act to assist alignment and coupling of a boat approaching the trailer. On approach of a boat, head 1 will first contact one of guides 5a or 5b. As guides 5a and 5b are angled forward, a forward motion of the boat may be continued. Alternatively, the boat may be pushed into coupling by it's motor, or pulled forward by a tow line. Should head contact one of guides 5a or 5b rearward of axial members 7a and 7b, stops 10a or 10b prevent guides 5a or 5b from presenting face-on, which would tend to limit the guiding function. The head 1 will continue forward along the guides until it contacts both guides, as shown in FIGS. 2A and 2B. Given continued forward force or motion, the separation between guides 5a and 5b widens to accept head 1, though rotation of guides 5a and 5b about axial members 7a and 7b. Tensioning component 15, in this example a spring, lengthens in response to the pressure of head 1 against guides 5a and 5b. With continued forward motion, head 1 moves through the separation and beyond guides 5a and 5b. The guides 5a and 5b are then brought together into the capture position of FIGS. 1A and 1B by tensioning component 15.

In an alternative operation, guides 5a and 5b do not rotate but rather slide apart. In that alternative configuration, guides 5a and 5b may be mounted in one or more tracks, permitting lateral guide motion. As head 1 presses against a guide it is forced in an outward direction, increasing the separation between the guides. A positioning device, such as a spring, might be included to bring a guide back to a default capture position in the absence of head pressure.

Figure 5:
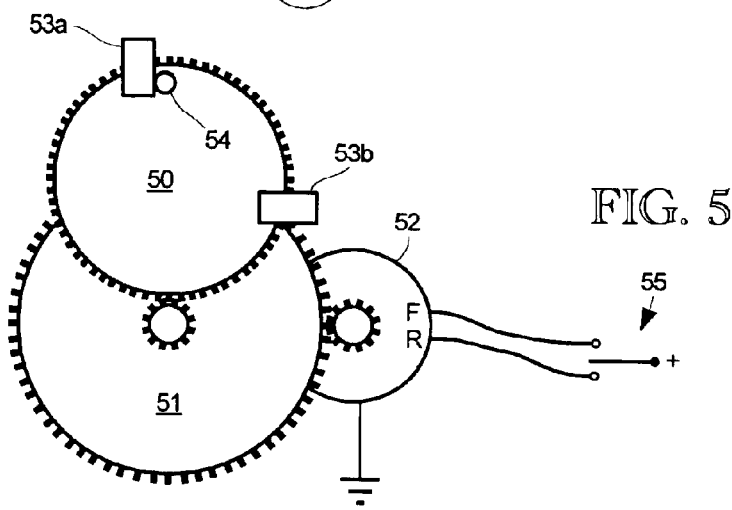
FIG. 5 illustrates a capture and release control mechanism utilizing electrical operation.
Figure 4:
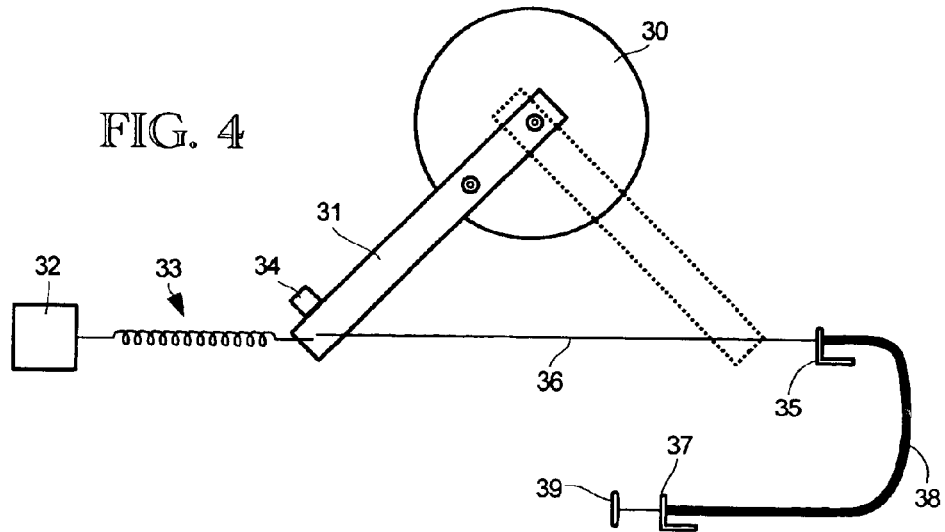
FIG. 4 illustrates a capture and release control mechanism utilizing mechanical operation.

Now the rotation of head 1 and related components may be controlled from the cockpit of the boat, two exemplary control systems being shown in FIGS. 4 and 5. By locating the release mechanism inside the boat, it may not be necessary to have an assistant in the course of launching the boat One person can position the boat and trailer in the water, enter the boat, operate the release, and thereby launch the boat.

Now referring to FIG. 4, a capture and release mechanism is depicted utilizing mechanical operation. A disk 30 is in physical communication with the head, and may be rotated to bring the head into a capture and a release position, for example by a shaft 2 in FIG. 1A. In this example, disk 30 is located within the hull, and secured though a swivel or rotating bearing device, for example a ball bearing device. A lever arm 31 is connected to disk 30, whereby a lateral force on the end of arm 31 may rotate disk 30. A tensional spring 33 and spring securement 32 provides force to arm 31, whereby the arm and disk 30 may be held in a default position, which is in this example the capture position. A stop 34 may also be provided to prevent the arm from over-rotating. A cable 36 attaches to arm 31, whereby a tensioning force on cable 36 may overcome the force exerted by spring 33 and move arm 31 into a release position shown in dashed lines, also rotating disk 30. Cable 36 is enclosed in a sheath 38 for a portion of its run, and is secured in place by brackets 35 and 37. A handle 39 is finally connected to cable 36 whereby an operator may pull handle 39 and put tension in cable 36, rotating arm 31 and disk 30 into the release position.

In FIG. 5 an electrical mechanism for rotating a head is depicted. A rotating disk or swivel device 50 is provided, which is physically connected to the head as in the example of FIG. 4. A protrusion 54 is provided in disk 50, which prevents the disk from rotating beyond a range of motion defined by stops 53a and 53b. A reversible DC motor 52 is provided, which is coupled to the teeth in disk 50 through a set of reduction gears, or in this example one reduction gear 51. DPST switch 55 provides a connection from a power source, such as a battery, to the forward and reverse terminals of motor 52, thereby causing rotation of disk 50 to a capture and a release position. If desired, further electronics may be incorporated whereby a momentary switch may be used. In that example, the default position of the toggle will be sensed by the electronics, which causes motor 52 to drive the disk into the capture position. The electronics may further include a sensor that turns off motor 52 when disk 50 reaches a certain position. Alternatively, motor 52 may be driven for a fixed period of time, after which the motor is de-energized and battery power is conserved. Likewise, when the momentary switch is activated, motor 52 is driven into the release position. A circuit breaker or other current limiting device may be included to prevent motor 52 from being overdriven and/or overheating.

Motor 52 may be substituted with other electromechanical devices, for example a stepper motor or a solenoid, and thus the particular configuration of FIG. 5 need not be adhered to. An indicator light may also be incorporated into the cockpit, so as to give the pilot an indication of the position of the head, which he may not be able to see from the cockpit. The indicator light might utilize a sensor on the disk or motor, or a current sensor sensing the current to the motor. Many other configurations are possible, as will be seen by one of ordinary skill.

Figure 6:
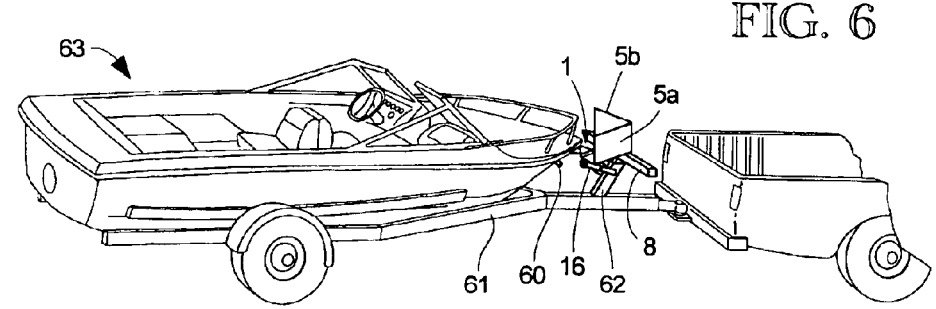
FIG. 6 illustrates conceptually the locations of various docking components relative to a trailer.

Shown conceptually in FIG. 6 is a trailer including elements as described above. Trailer 61 includes a vertically projecting member 62, on which is mounted base 8. Base 8 might attach through an insertable portion to vertical member 62, secured with a setscrew or bolt. Likewise, base 8 might be attached through U-bolts, or any number of other attachments. Guides 5a and 5b are further mounted to base 8, as described above. Head 1 projects from the bow of boat 63, here shown in a decoupled position from guides 5a and 5b. A conventional winch tiedown system 16 may be incorporated into trailer 61, which may secure boat 63 generally to vertical member 62 through a cable connectable to U-bolt 60.

An alternate docking system differs from that shown in FIGS. 1A, 1B, 2A, 2B, 3A and 3B in that guides 5a and 5b are held in a fixed position. In that system, axial members 7a and 7b may be replaced by structural members, plates 5a and 5b firming affixed thereto through welding or other attachment. As guides 5a and 5b do not move in that example, tensioning component 15 and other components may be omitted, as will be understood by one of ordinary skill.

That alternate docking system utilizes a head incorporating retracting catch surfaces, one exemplary head 70 being depicted in FIG. 7. Head 70 includes a body 71, with raised portions 72, 73, and 74. In this example, body 71 may be machined from a block of metal or other hard composite or plastic as described. Alternatively, body might be fashioned from stamped and pressed metal, or many other manufacturing methods. Body also attaches to a shaft 77, as in the above described examples. A cover, not shown, may be attached over raised portions 72, 73, and 74 to complete the head body assembly, for example by threaded fasteners or by welding.

Raised portion 72 provides impact strength to the front of head 70, which is the area that may strike guides 5a and 5b. Raised portion 73 provides protection for the internal components of head 70, and may further prevent insertion of foreign objects. Pawls 75a and 75b (catches), pivot about pins 78a and 78b, which might in one example be pressed into body 71 and the top. Pawls 75a and 75b may move into an extended and retracted position, pawl 75a being shown in the extended and pawl 75b shown in the retracted positions. Pawls 75a and 75b are forced outward into the extended position by compression springs 76a and 76b, which rest in recesses in raised portion 74.

The docking operation of head 70 is as follows. Head 70 first encounters guides on it's forward surfaces, which surround raised region 72. As the head moves forward, the head encounters the separation between the guides, which in one example is about three inches. The width of body 71 is dimensioned slightly smaller than that separation. Head 70 therefore moves forward until pawls 75a and 75b contact the guides. Inward pressure is exerted on pawls 75a and 75b as the head 70 continues to move forward between the guides, by which the pawls are brought into their retracted positions. As head 70 continues forward, pawls 75a and 75b move beyond the guides, and snap back into extended positions. Pawls 75a and 75b then present latchable surfaces 79a and 79b to the guides, which prevents backward motion of the head out of the receiver. Head 70 may be released from the receiver by rotating to a release position, as in the above described examples.

FIGS. 8A, 8B and 8C depict components of another head having pawls and further having a cavity 86 wherein a motor may be placed. Referring now to FIG. 8A, a left pawl 80a is shown having a pivot hole 82 through which a pin, rivet, bolt or other securement may pivotally attach the pawl 80a to head body 81. A slot 83 is also provided in pawl 80a to further secure the pawl to head body 81 and further to permit a range of rotation about the pivot hole 82. Pivot hole 82 and slot 83 are both recessed about the perimeter, permitting a bolt or other fastener to be seated at a lower profile in the assembled head. A side rail 85 extends downward, as if looking at FIG. 8A from above, providing a surface on which a guide or plate may ride. The pawl shown in FIG. 8A might be made using stamping and/or pressing operations using plate steel material. A right pawl 80b may be fashioned to be the mirror image of left pawl 80a In FIG. 8B a body 81 is shown including a cavity 86 which is shaped to accept and mount a geared motor. Cavity 86 further includes a shaft passage, not shown, for communicating the motor shaft to the exterior of body 81 to a connection with a fixed member. Recesses 88 may be provided for reducing the profile of pawls 80a and 80b, perhaps flush with the remainder of body 81. Fastener holes 87 and 89 are provided to accept fasteners securing pawls 80a and 80b using pivot holes 82 and slots 83. Body 81 might be fashioned using machining techniques and a machinable material such as aluminum.

Finally, in FIG. 8C an assembled head is shown using body 81 and pawls 80a and 80b, which pawls are mounted externally to body 81 as described above. Pawl 80a is shown in an extended position and pawl 80b is shown in a retracted position, as if pressure were being applied to pawl 80b and not 80a Referring now to FIG. 9, another exemplary docking and securing system is depicted having a motor 102 included in head 100. Head 100 is shown in the captured position, generally between and afore guides 101a and 101b. Motor 102 is of the type including internal reduction gears, and is affixed to head by way of pin 104. A shaft 105 extends toward the bow of the boat, ending and being attached to a mounting plate 107 by a hex key 109. As motor 102 is energized, the housing of motor 102 rotates, and head 100 also rotates being fixed thereto. Swivel plate 106 riding on bearings 110 in a bearing race are provided to resist forces that may strike the forward portion of head 100, particularly during docking operations when head 100 may strike guides 101a and 101b. In this example, the rotational motion of head 100 may be restricted through stop blocks located in plates 106 and 107, perhaps within the circumference of the bearing race. A boat adapter 108 is fashioned to fit the particular hull 111 of the boat, and attaches to mounting plate 107, thereby securing the head assembly to the boat. A motor cable 103 is passed through swivel plate 106 through a slot or large hole and through mounting plate 107, boat adapter 108 and hull 111 through a small channel, which may then be routed to a control device in the cockpit.

Figure 9:
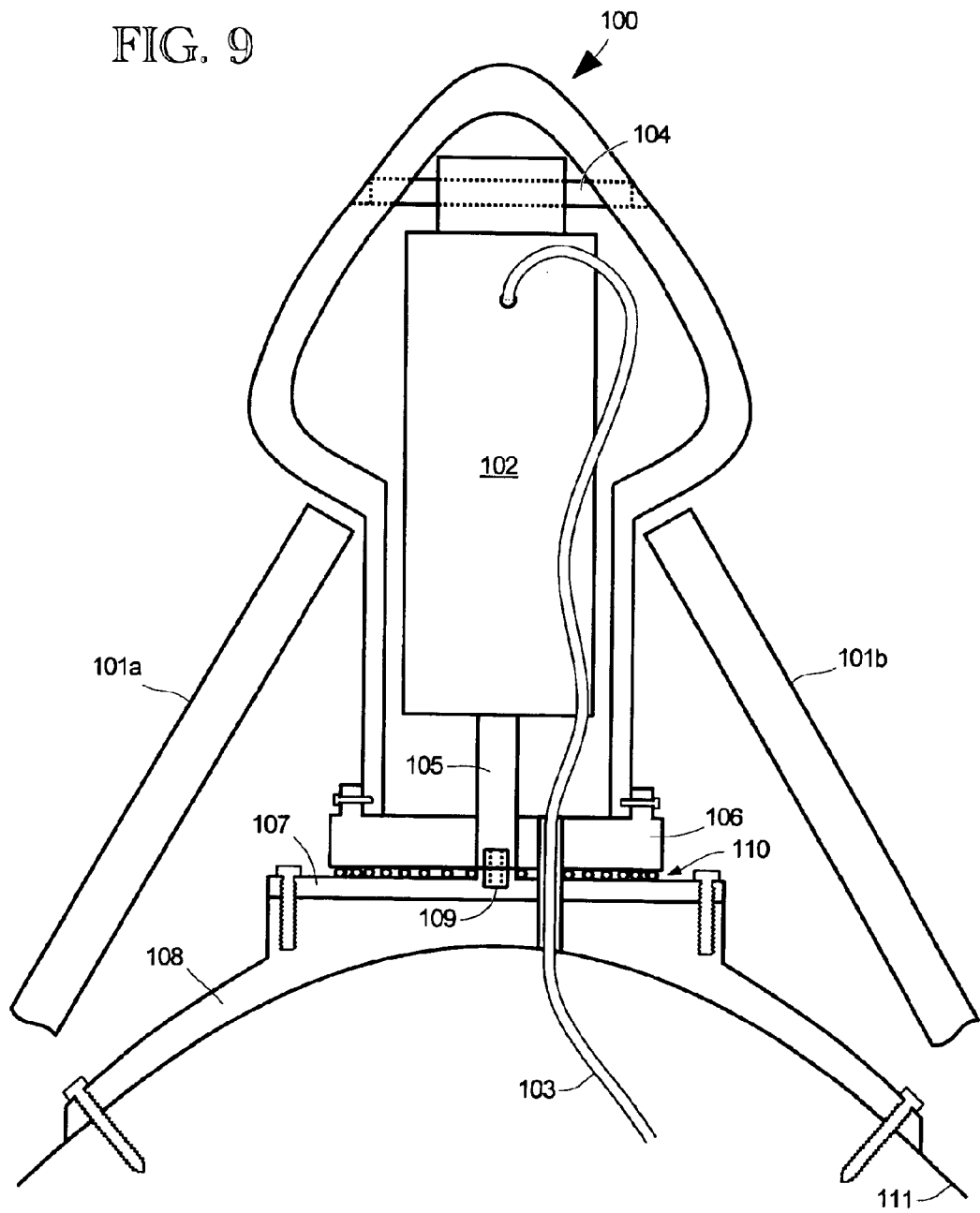
FIG. 9 depicts a bow mountable portion having a motor included within a capturable head external to the hull of a boat.

The example boat attachable portion of FIG. 9 is less intrusive than earlier examples on a boat's hull, as only small holes need by made therein for fasteners and the wire channel. Additionally, the space within hull 111 is not invaded, which makes that exemplary system more suitable for boats with limited bow space.

Another exemplary boat attachable portion is depicted in FIG. 10A, which includes a retractable head. In this example, a head 120a is shown captured between guides 122a and 122b. In this example, guides 122a and 122b are thicker than in prior examples, which permit pawls 121a and 121b to rest against the edge of those guides. As in prior examples, pawls 121a and 121b pivot to permit insertion of the head 120 through the separation between guides 122a and 122b. A spring 123 provides tension to keep pawls 121a and 121b in a default extended position in the absence of pressure. Now it is to be understood that pawls 121a and 121b might be substituted with fixed head features having other contact surfaces, provided that guides 122a and 122b may be separated, as in earlier examples.

Head 120 includes a shaft 124 which passes through hull 135, in this example, and is affixed to a motor shaft 128. Shaft 124 is restricted laterally by a guide 125, which is affixed to an internal structure of the boat. A bearing component 126 fixes lateral motion at the end of shaft 124 while permitting rotation thereof. Motor shaft 128 is driven by motor 127 through internal reduction gears to provide the necessary torque to rotate head 120 in operation. A carriage 134 provides a platform for motor 127 and other components, and is permitted to travel through a range in a forward and rearward motion relative to the hull 135. In this example, carriage 134 is affixed to slides 129a and 129b, which are in turn attached to a bracket 130 affixed to an internal structure of the boat. The position of carriage 134 is controlled by driving motor 131, on which is attached a gear 133 affixed to that motor's shaft. As gear 133 rotates, a force is exerted on carriage 134 through toothed track 132, which teeth mesh and communicate with the teeth of gear 133.

As gear 133 rotates in a forward-driving rotation, track 132 and carriage 134 are forced forward, which also forces shaft 124 and head 120 into a more extended position from the hull 135. Likewise, a rearward-driving rotation on gear 133 retracts shaft 124 and head 120 toward the hull. Guide 125 may be configured to act as a forward stop for carriage 134, perhaps using a surface of bearing component 126. Other devices may be included to stop motion in the forward or rearward directions of carriage 134, as will be understood by one of ordinary skill. Likewise, rotational stops may be included to restrict the rotation of shaft 124, which might, for example, be accomplished by the insertion of one or more pins into the shaft coming into interference with components fixed to the boat. In an alternate configuration, a solenoid replaces motor 131, and gear 133 and track 132 are omitted.

Figure 10B:
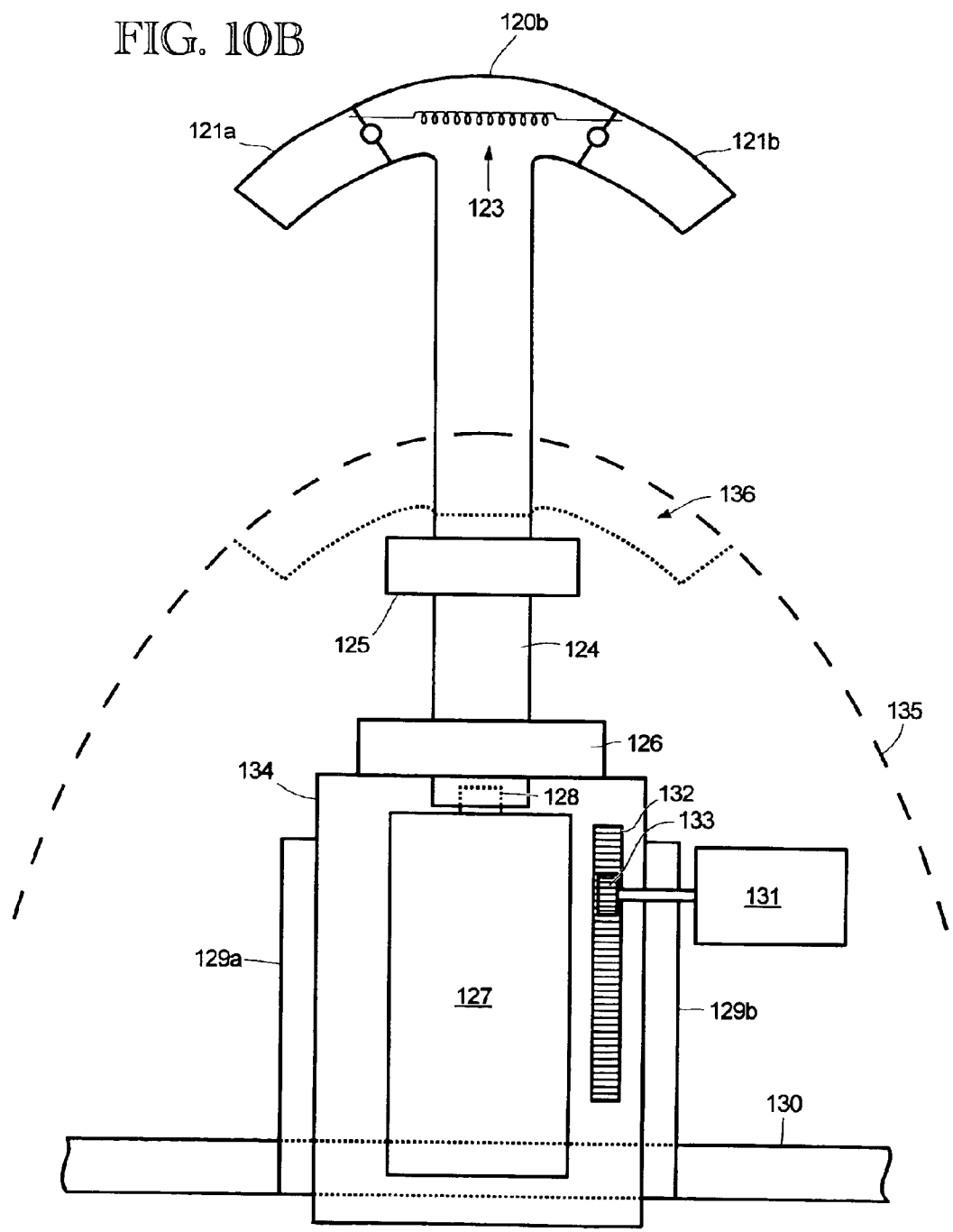
FIG. 10B conceptually illustrates a bow mountable portion having a head designed to retract into a recess in a hull.

Referring now to FIG. 10B, a bow-mounted portion is depicted similar to that of FIG. 10A further including a head 120b retractable into a recess 136. In that example, head 120b is shaped to match the curve of hull 135, although that is not a requirement Head 120b may be painted or finished similarly to the hull 135, which may serve to camouflage or reduce the noticeability of the head.

As for materials, many types of materials may be used, provided that consideration is given to the desirable strength and durability of the system. Aluminum may be particularly desirable, as it is not subject to rust and is relatively easy to machine. Stainless steel is also a good choice, with its relative strength. Steel might also be advantageously used, especially if plated with nickel or other rust-inhibiting material. Yet many other metals, plastics and composites might be used, as will be understood by one of ordinary skill.

In another exemplary system the bow portion is constructed of rust-impervious materials, such as aluminum and nylon, as the bow portion is the most likely to encounter long exposure to water. In that system, the receiver portion may be fashioned from steel, rubber and other weathering materials, provided that moving portions are lubricated sufficiently to ensure protection and movement of joints. The receiver portion may also be coated, for example with enamel, to prolong the life of the component parts.

Now although the systems described above have been discussed in relation to a boat, those systems may be adapted to other watercraft types with minor modification, for example hovercrafts and jet-skis, and many other types. Described systems might also be adapted for use with land vehicles, for example all-terrain vehicles. The scope of use of the above described systems should therefore be interpreted broadly rather than restrictively.

While various systems incorporating a bow mountable portion capturable in a receiver or trailer portion have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed:

1. A system for docking a watercraft to a trailer, comprising:
   a bow attachment, said bow attachment including a head installable to a watercraft in a protruding position from the bow of the watercraft, said head including at least one latchable surface, said bow attachment providing a radial motion for turning said head into a capture and a release position;
   a receiver adapted to be mounted to a trailer;
   a separation included in said receiver through which said head may insertably pass through to be captured when said head is in capture position;
   guides included in said receiver configured to guide said head into said separation on forward motion of the watercraft;
   a mechanism for turning said head into both the capture and release positions;
   wherein said head in the capture position, after entering said separation of said receiver, is prevented from exiting said receiver provided that the watercraft remains in a substantially normal position relative to the trailer, and
   wherein said head in the release position, after entering said separation of said receiver, may escape the confines of said receiver upon aft motion of the watercraft.

2. A system according to claim 1, further comprising:
   for each of said guides, an axial member;
   at least one coupling connecting each of said guides to its corresponding axial member such that each of said guides may rotate about the axis of its corresponding axial member; and
   for each of said guides, a stop positioned to retain the guide in a fixed position in the absence of pressure from said head.

3. A system according to claim 2, wherein said head is comprised of a unitary hard body with no moving parts.

4. A system according to claim 1, wherein each of said guides is attached to said receiver in a fixed position.

5. A system according to claim 4, wherein said head includes at least one movable catch, each of said catches having a normal and at least one entrance position, each of said catches further having a capture surface for maintaining a position relative to said receiver when said head is in the capture position, wherein said catches present the capture surface in the normal position and further wherein said catches do not substantially present the capture surface in the entrance position.

6. A system according to claim 1, wherein said separation permits entry of said head through a substantial range of vertical positions.

7. A system according to claim 1, wherein said separation permits movement of said head relative to said receiver in a substantial vertical range.

8. A system according to claim 1, wherein the receiver is configured to secure said bow attachment against a reverse direction of the boat and further against a substantial lateral motion relative to the receiver, and further wherein the receiver is configured to permit said bow attachment to move through a range of vertical motion relative to the receiver.

9. A system according to claim 1, further comprising a control mountable in the cockpit of the watercraft operable to cause said head to turn.

10. A system according to claim 1, further comprising an indicator system installable to the cockpit of the watercraft operable to indicate the position of said head.

11. A system according to claim 1, wherein said head includes a motor configured to rotate said head relative to the bow of the watercraft.

12. A system according to claim 1, wherein said head is extendable through a range of positions relative to the bow of the watercraft.

13. A system according to claim 1, wherein said guides are lined with a relatively soft material to inhibit damage to the watercraft.

14. A system according to claim 1, further comprising a tensioning component fastened to each of said guides, wherein said tensioning component provides a convergent force between said guides.

15. A system for docking a watercraft to a trailer, comprising:
   a bow attachment, said bow attachment including a substantially arrowpoint-shaped head installable to a watercraft in a protruding position from the bow of the watercraft, said head including at least two latchable surfaces, said bow attachment providing a radial motion for turning said head into a capture and a release position;

a receiver adapted to be mounted to a trailer;

a separation included in said receiver through which said head may insertably pass through to be captured when said head is in capture position;

guides included in said receiver configured to guide said head into said separation on forward motion of the watercraft;

a mechanism for turning said head into both the capture and release positions;

wherein said head in the capture position, after entering said separation of said receiver, is prevented from exiting said receiver provided that the watercraft remains in a substantially normal position relative to the trailer, and wherein said head in the release position, after entering said separation of said receiver, may escape the confines of said receiver upon aft motion of the watercraft.

16. A system according to claim 15, further comprising:
   for each of said guides, an axial member;

at least one coupling connecting each of said guides to its corresponding axial member such that each of said guides may rotate about the axis of its corresponding axial member;

for each of said guides, a stop positioned to retain the guide in a fixed position in the absence of pressure from said head; and wherein said head is comprised of a unitary hard body with no moving parts.

17. A system according to claim 15, wherein each of said guides is attached to said receiver in a fixed position; further wherein said head includes at least two movable pawls, each of said pawls having a normal and at least one entrance position, each of said pawls further having a capture surface for maintaining a position relative to said receiver when said head is in the capture position, wherein said pawls present the capture surface in the normal position and further wherein said pawls do not substantially present the capture surface in the entrance position.

* * * * *